United States Patent [19]

Tsunetsugu

[11] Patent Number: 5,646,514

[45] Date of Patent: Jul. 8, 1997

[54] AC/DC CONVERTER USING A NON-LATCH TYPE SWITCHING DEVICE

[75] Inventor: Yukio Tsunetsugu, Kawasaki, Japan

[73] Assignee: Kabushiki Kaisha Toshiba, Kawasaki, Japan

[21] Appl. No.: 322,349

[22] Filed: Oct. 13, 1994

[30] Foreign Application Priority Data

Nov. 1, 1993 [JP] Japan .................................. 5-273612

[51] Int. Cl.⁶ .................................................. G05F 1/40
[52] U.S. Cl. ......................... 323/288; 323/285; 323/289; 363/89
[58] Field of Search .................................. 323/299, 303, 323/271, 284, 288, 289, 351, 285; 363/89, 125, 126, 127

[56] References Cited

U.S. PATENT DOCUMENTS

| | | | |
|---|---|---|---|
| 3,265,956 | 8/1966 | Schlabach | 323/284 |
| 4,806,844 | 2/1989 | Claydon et al. | 323/311 |
| 5,126,652 | 6/1992 | Carlin | 323/267 |
| 5,430,637 | 7/1995 | Buck | 363/89 |

FOREIGN PATENT DOCUMENTS

| | | |
|---|---|---|
| A-0106041 | 4/1984 | European Pat. Off. . |
| A-0327174 | 8/1989 | European Pat. Off. . |
| A-0500113 | 8/1992 | European Pat. Off. . |
| A-2672448 | 8/1992 | France . |

OTHER PUBLICATIONS

"World–Wide Single Chip Power Supply", Produced by Harris Semiconductor, HV–2405E, (1991), File No. 2487, pp. 1–3.

*Primary Examiner*—Peter S. Wong
*Assistant Examiner*—Shawn Riley
*Attorney, Agent, or Firm*—Finnegan, Henderson, Farabow, Garrett & Dunner, L.L.P.

[57] ABSTRACT

An AC/DC converter includes a rectifying circuit, a main switching device constituted by an N-channel IGBT or an N-channel FET, a control circuit, a booster circuit, and a series power supply circuit. The rectifying circuit rectifies a half wave of an input AC voltage. One end of the current path of the main switching device is supplied with a half-wave rectifying output from the rectifying circuit. The control circuit turns on the main switching device when a voltage between the gate and the other end of the main switching device exceeds a first level, and turns off the main switching device when the voltage exceeds a second level which is higher than the first level. The booster circuit boosts the voltage between the gate and the other end of the main switching device to a level which is higher than the second level when the voltage exceeds the first level. The series power supply circuit has an input terminal to which the other end of the current path of the main switching device is connected, and outputs a DC voltage.

16 Claims, 9 Drawing Sheets

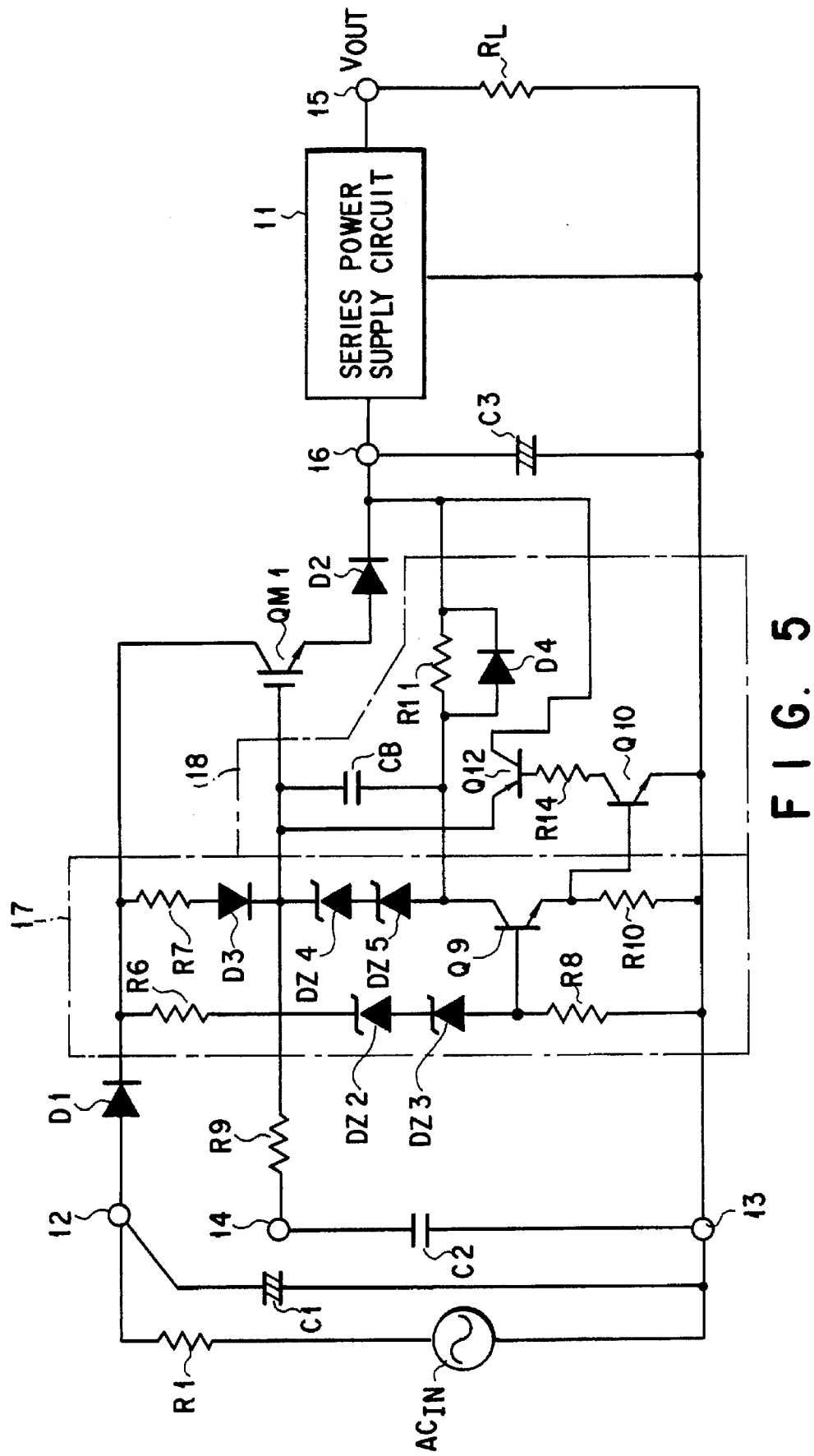
F I G. 5

5,646,514

AC/DC CONVERTER USING A NON-LATCH TYPE SWITCHING DEVICE

BACKGROUND THE INVENTION

1. Field of the Invention

The present invention relates to an AC/DC converter for rectifying a commercial AC power supply voltage or converting a commercial AC power supply voltage to a stable DC voltage and, in particular, to an AC/DC converter for use in a transformerless power supply of the industrial consumer field.

2. Description of the Related Art

HV-2045E of HARRIS has been placed on the market as an AC/DC converter for use in a transformerless power supply. Its detailed specifications and circuit arrangement are shown in File Number 2487 of the brochure of HV-2045E.

The AC/DC converter of HV-2045E includes a double-gate thyristor serving as a main switching device. A commercial AC power supply voltage (hereinafter referred to as AC power supply voltage) is applied to the double-gate thyristor. When the AC power supply voltage exceeds a predetermined value of about 3 $V_F$, the thyristor is turned on, and this turn-on state is maintained during a period of time corresponding to a positive sinusoidal half wave of the AC power supply voltage. During a period of time corresponding to a negative sinusoidal half wave thereof, the current flowing through the thyristor is smaller than a holding current, and the thyristor is turned off, thereby maintaining this turn-off state.

Since, however, the thyristor serving as a main switching device of the AC/DC converter is of a latch type, there is a possibility that the AC/DC converter cannot be regulated if a current flowing through a load is increased suddenly at a frequency which is higher than a commercial frequency. More specifically, since the thyristor can be turned on only once during the period of time corresponding to the positive sinusoidal half wave, if the load varies (becomes great) immediately after the thyristor is turned off, an output voltage of the AC/DC converter will be decreased, even though it is backed up by electric charge of a capacitor. The decrease in the output voltage prevents the AC/DC converter from being regulated.

SUMMARY OF THE INVENTION

It is accordingly an object of the present invention to provide an AC/DC converter which is regulated in spite of a sudden increase in current flowing through a load to be driven.

The above object is attained by providing an AC/DC converter comprising:

a rectifying circuit for rectifying a half wave of an input AC voltage;

an N-channel IGBT having a current path one end of which is supplied with a half-wave rectifying output of the rectifying circuit, and serving as a main switching device;

a control circuit for turning on the N-channel IGBT when a voltage between a gate of the N-channel IGBT and the other end of the current path exceeds a first level, and for turning off the N-channel IGBT when a voltage between the gate of the N-channel IGBT and the other end of the current path exceeds a second level which is higher than the first level;

a booster circuit for boosting the voltage between the gate of the N-channel IGBT and the other end of the current path up to a level which is higher than the second level, when the voltage between the gate of the N-channel IGBT and the other end of the current path exceeds the first level; and a series power supply circuit for receiving an output from the other end of the current path of the N-channel IGBT, and outputting a DC voltage.

The above object is also attained by providing an AC/DC converter comprising:

a rectifying circuit for rectifying a half wave of an input AC voltage;

an N-channel FET having a current path one end of which is supplied with a half-wave rectifying output of the rectifying circuit, and serving as a main switching device;

a control circuit for turning on the N-channel FET when a voltage between a gate of the N-channel FET and the other end of the current path exceeds a first level, and for turning off the N-channel FET when a voltage between the gate of the N-channel FET and the other end of the current path exceeds a second level which is higher than the first level;

a booster circuit for boosting the voltage between the gate of the N-channel FET and the other end of the current path up to a level which is higher than the second level, when the voltage between the gate of the N-channel FET and the other end of the current path exceeds the first level; and a series power supply circuit for receiving an output from the other end of the current path of the N-channel FET, and outputting a DC voltage.

In the AC/DC converter having the above circuit arrangement, the main switching device can be turned on at the rise and fall of the sinusoidal half wave of an AC voltage using both the control circuit and booster circuit, since the main switching device is constituted by a non-latch type N-channel FET or N-channel IGBT. Even though a large amount of current suddenly flows through a load to be driven, the output voltage can be prevented from dropping, as compared with a conventional AC/DC converter using a latch-type device as a main switching device. Therefore, the AC/DC converter of the present invention is considerably regulated in spite of to a sudden increase in the current flowing through the load to be driven.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a circuit diagram showing an AC/DC converter according to a third embodiment of the present invention;

DETAILED DESCRIPTION OF THE PREFERRED EMBODIMENTS

Figure 1:
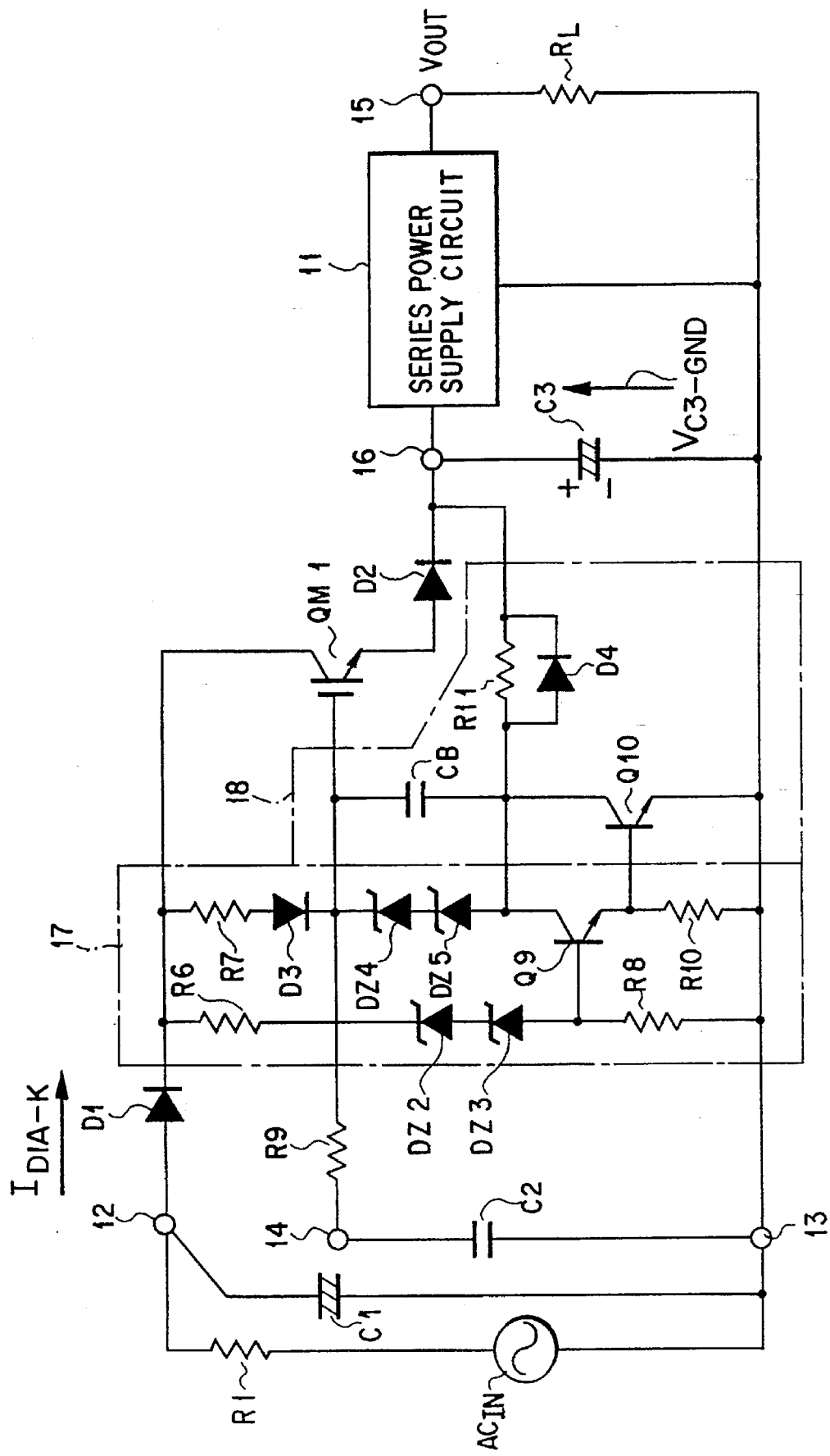
FIG. 1 is a circuit diagram showing an AC/DC converter according to a first embodiment of the present invention.
Figure 2A:
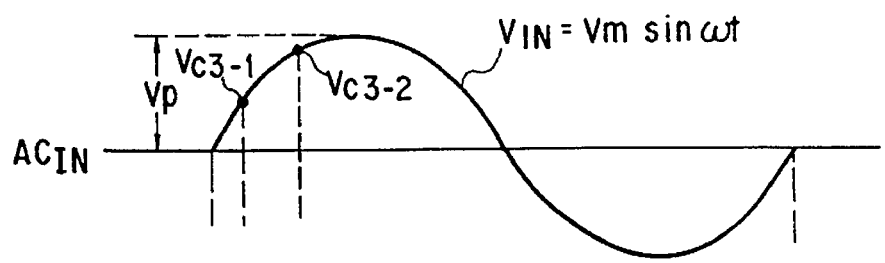
FIGS. 2A–2D are views of waveforms for explaining an operation of the AC/DC converter of FIG. 1 which is in a steady state.
Figure 2B:
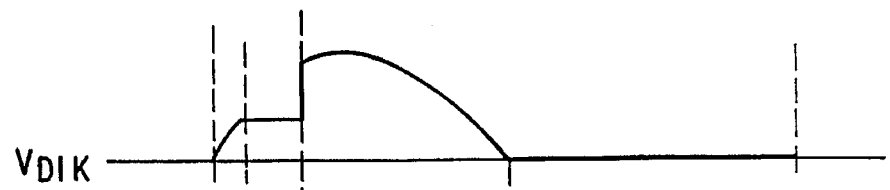
Figure 2C:
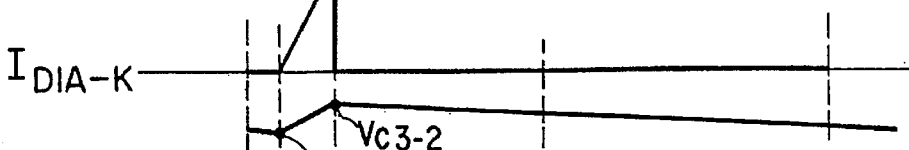
Figure 2D:
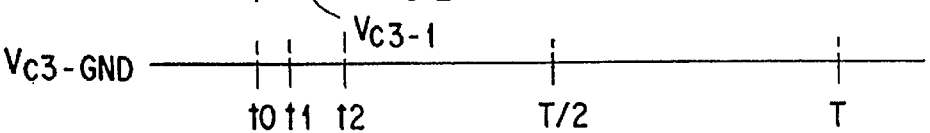

FIG. 1 shows an AC/DC converter according to a first embodiment of the present invention. The AC/DC converter includes resistors R6 to R11, diodes D1 to D4, NPN bipolar transistors Q9 and Q10, zener diodes DZ2 to DZ5, an N-channel IGBT QM1 serving as a main switching device, a capacitor CB, and a series power supply circuit 11.

The diode D1 is used to rectify a half wave of an AC voltage $AC_{IN}$. The anode of the diode D1 is connected to a first power supply terminal 12 and the cathode thereof is connected to one end of each of the resistors R6 and R7 and to the collector of the IGBT QM1. The cathode-to-anode paths of the Zener diodes DZ2 and DZ3 and the resistor R8 are connected in series between the other end of the resistor R6 and a second power supply terminal 13. The anode-to-cathode path of the diode D3 is connected between the other end of the resistor R7 and the gate of the IGBT QM1. The resistor R9 is connected between the gate of the IGBT QM1 and an inhibit terminal 14 to protect the gate. The cathode-to-anode paths of the Zener diodes DZ4 and DZ5, the collector-to-emitter path of the transistor Q9, and the resistor R10 are connected in series between the gate of the IGBT QM1 and the second power supply terminal 13. The base of the transistor Q9 is connected to a connecting point of the Zener diode DZ3 and resistor R8, and the emitter thereof is connected to the base of the transistor Q10. The resistors R6 to R8 and R10, diode D3, Zener diodes DZ2 to DZ5, and transistor Q9 constitute a control circuit 17 for turning on/turning off the IGBT QM1.

The collector of the transistor Q10 is connected to that of the transistor Q9, and the emitter thereof is connected to the second power supply terminal 13. A capacitor CB is connected between the collector of the transistor Q10 and the gate of the IGBT QM1. The resistor R11 and the anode-to-cathode path of the diode D4 are connected in parallel between the collector of the transistor Q10 and a capacitor connecting terminal 16. The transistor Q10, capacitor CB, resistor R11, and diode D4 constitute a booster circuit 18 for boosting a gate-to-emitter voltage of the IGBT QM1.

The anode of the diode D2 is connected to the emitter of the IGBT QM1, and the cathode thereof is connected to the connecting terminal 16. The input terminal of the series power supply circuit 11 is connected to the terminal 16, and the second power supply terminal 13 and output terminal 15 are connected to the circuit 11.

An AC power supply $AC_{IN}$ and a resistor R1 are externally connected in series between the first and second power supply terminals 12 and 13. The resistor R1 is used to restrict the peak of the main current. Further, a capacitor C1 is externally connected between the terminals 12 and 13, a capacitor C2 is externally connected between the terminals 14 and 13, and a capacitor C3 is connected between the terminals 16 and 13. The capacitor C3 serves to smooth the input voltage of the series power supply circuit 11. When the IGBT QM1 is turned on, the capacitor C3 is charged and bootstraps the gate of the IGBT QM1 through the capacitor CB. The diode D2 is formed to prevent a current from flowing reversely from the capacitor C3 toward the control circuit 17. A load $R_L$ (which is shown equivalently as a resistor $R_L$ in FIG. 1) is connected between the output terminal 15 and second power supply terminal 13.

An operation of the AC/DC converter having the above circuit arrangement, will now be described. In the initial state where an AC power supply voltage is applied to the AC/DC converter, if both the interelectrode voltages of the capacitors CB and C3 are 0 V, a current D1A-K flows from the resistor R1 to the capacitor C3 through the diode D1, resistor R7, diode D3, capacitor CB, and resistor R11 in this order, thereby charging the capacitor C3. Assume that the capacitance of the capacitor CB is represented by $C_B$ and that of the capacitor C3 is represented by $C_3$. Under the condition of $C_B \ll C_3$, if the voltage of the capacitor CB increases greatly and the gate-to-emitter voltage of the IGBT QM1 exceeds a threshold voltage ($V_{th}$), the IGBT QM1 is turned on to charge the capacitor C3 quickly. However, the interelectrode voltage of the capacitor CB is clamped by the sum of Zener voltages of the Zener diodes DZ4 and DZ5, and this clamped voltage corresponds to the maximum charging voltage.

The steady state of the AC/DC converter will now be described, with reference to the waveforms shown in FIGS. 2A–2D. For easy understanding of a bootstrap operation, the steady state during a period of time T/2 from the turn-off of the IGBT QM1 until the end of the positive sinusoidal half wave, will be described. When the cathode voltage $V_{D1K}$ of the diode D1 exceeds a value expressed by the following equation (1), the IGBT QM1 is turned off.

$$V_{D1K}=2*(r_6/r_8+1)*V_{BE9}+V_{DZ2}+V_{DZ3} \tag{1}$$

where $r_6$ and $r_8$ are resistances of the resistors R6 and R8, $V_{BE9}$ is a base-to-emitter voltage of the transistor Q9, and $V_{DZ2}$ and $V_{DZ3}$ are Zener voltages of the Zener diodes DZ2 and DZ3, respectively. More specifically, if the above equation is satisfied, the transistors Q9 and Q10 are turned on, the gate voltage of the IGBT QM1 is dropped, the emitter voltage thereof is fixed to a low value, and the gate-to-emitter voltage thereof is lowered. Thus, the IGBT QM1 is completely turned off.

$$V_{DZ4}+V_{DZ5} \ll 2*(r_6/r_8+1)*V_{BE9}+V_{DZ2}+DZ3 \tag{2}$$

where $V_{DZ4}$ and $V_{DZ5}$ are Zener voltages of the Zener diodes DZ4 and DZ5.

When the above relationship (2) is satisfied, the IGBT QM1 cannot be completely turned off since the collector of the transistor Q10 is connected as shown in FIG. 1. This can be understood from the fact that the IGBT QM1 operates as an emitter follower since the gate potential is lowered when the IGBT QM1 is turned off. However, no problems arise if the resistance of the resistor R11 is set to a proper value. Then the drain current ID is given by the following equation (3) if the resistance of the resistor R11 is represented by $r_{11}$.

$$ID = (V_{DZ4} + V_{DZ5} - V_{th} - V_{D2})/r_{11} \quad (3)$$

If $V_{DZ4} = V_{DZ5} = 6$ V, $r_{11} = 10$ KΩ, and $V_{th} = 2$ V, the drain current ID is in the order of mA, and a power loss can be almost disregarded.

FIGS. 2A–2D are views of waveforms for explaining an operation of the AC/DC converter of FIG. 1 which is in a steady state.

During a period of time corresponding to the positive sinusoidal half wave during which the IGBT QM1 is turned off, the capacitor CB maintains an interelectrode voltage of $V_{DZ4} + V_{DZ5}$ and is preparing for turning on the IGBT QM1 during the next period of time. If, at the beginning of the next positive sinusoidal half wave, the gate of the IGBT QM1 is bootstrapped and the cathode voltage $V_{D1K}$ of the diode D1 exceeds a predetermined value of $V_{C3-1}$ ($V_{D1K} \geq V_{FD2} + V_{C3}$=a condition for causing the diode D2 to be biased forwardly), the collector current of the IGBT QM1 starts to flow.

Figure 3A:
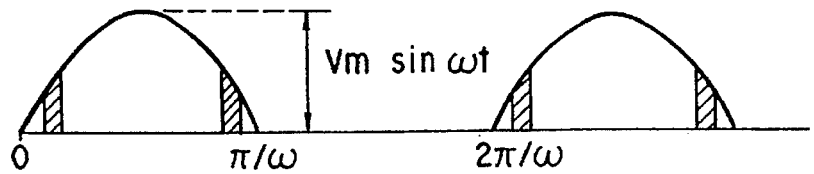
FIG. 3A is a view showing a waveform for explaining a usable portion of AC voltage of the AC/DC converter of FIG. 1.
Figure 3B:
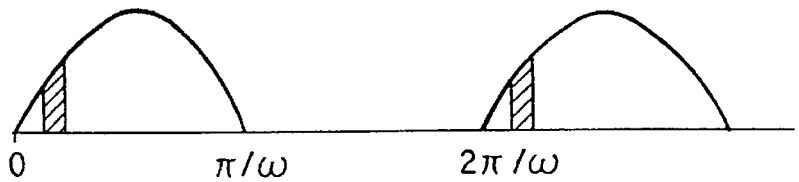
FIG. 3B is a view showing a waveform for explaining a usable portion of AC voltage of a conventional AC/DC converter.

FIG. 3A shows a usable portion of AC voltage of the AC/DC converter of FIG. 1, and FIG. 3B shows a usable portion of AC voltage of a conventional AC/DC converter. In FIG. 3A the usable portion of AC voltage is a rectified halfwave of AC power supply voltage $AC_{IN}$ of the AC/DC converter of FIG. 1. In FIG. 3B the usable portion of AC voltage is a rectified halfwave of a similar AC power supply voltage in the conventional AC/DC converter. The main switching device is turned on in the hatched areas of FIGS. 3A and 3B. In the first embodiment of the present invention, since the IGBT QM1, which is a non-latch type switching device, is employed as the main switching device, it can be turned on at two positions of the positive sinusoidal half wave, and the load current capacity can be increased accordingly. Therefore, according to the present invention, the level of output voltage $V_{OUT}$ can be prevented from decreasing even if the current flowing through the load $R_L$ is increased rapidly, and the capacitance of the capacity C3 necessary for obtaining the same current can be reduced.

Figure 4:
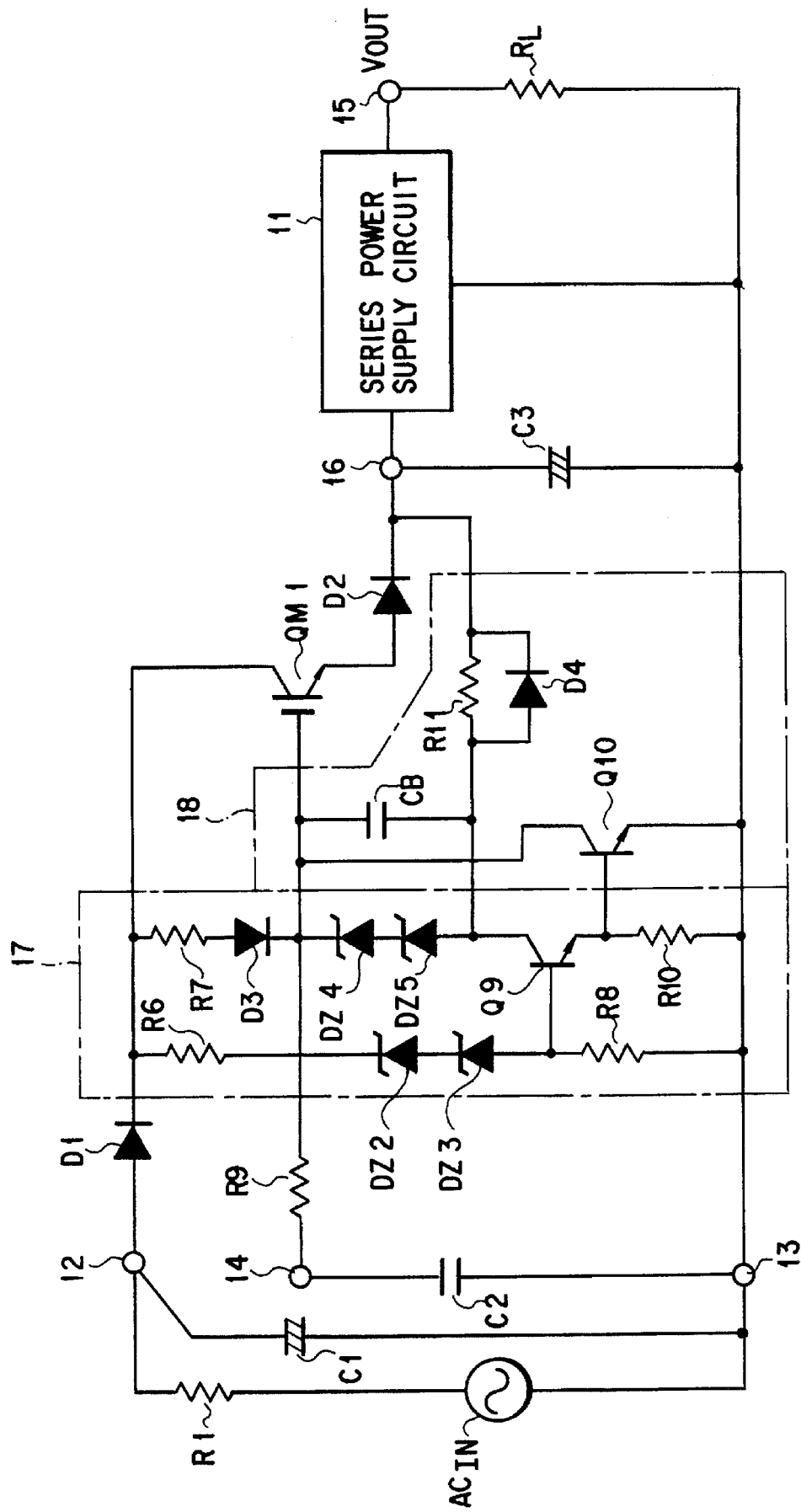
FIG. 4 is a circuit diagram showing an AC/DC converter according to a second embodiment of the present invention.

FIGS. 4 and 5 are circuit diagrams showing AC/DC converters according to the second and third embodiment of the present invention, respectively. These converters are so arranged that the IGBT QM1 of FIG. 1 is completely turned off. The circuit arrangement of FIG. 4 is the same as that of FIG. 1, except that the collector of the transistor Q10 is connected to the gate of the IGBT QM1. In the circuit of FIG. 5, a resistor R14 and a PNP bipolar transistor Q12 are added to the circuit of FIG. 1. One end of the resistor R14 is connected to the collector of the transistor Q10. The emitter of the transistor Q12 is connected to the gate of the IGBT QM1, the collector thereof is connected to the cathode of the diode D2, and the base thereof is connected to the other end of the resistor R14.

The above circuit arrangements shown in FIGS. 4 and 5 allow the IGBT QM1 to be completely turned off and also allows the drain current ID (explained above in relation to the circuit of FIG. 1) to be decreased to a low value of leakage current or the like.

Figure 6:
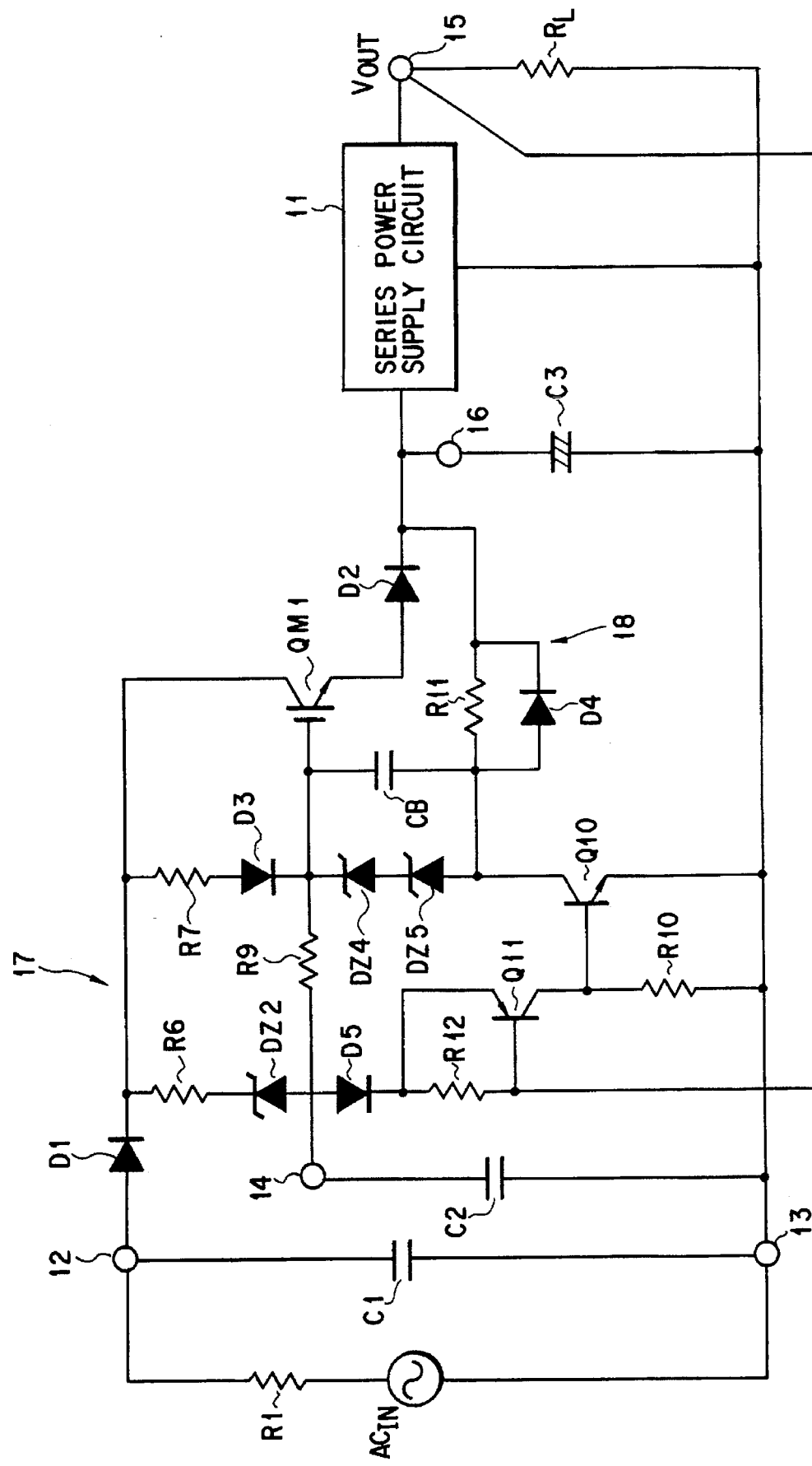
FIG. 6 is a circuit diagram showing an AC/DC converter according to a fourth embodiment of the present invention.

FIG. 6 is a circuit diagram showing an AC/DC converter according to a fourth embodiment of the present invention, in which the output voltage V OUT is fed back to the cathode side of the diode D1. More specifically, the base of the PNP bipolar transistor is connected to the output terminal 15, and the collector thereof is connected to both the base of the transistor Q10 and one end of the resistor R10. Furthermore, the anode of the diode D5 is connected to that of the Zener diode DZ2, and a resistor R12 is connected between the cathode of the diode D5 and the base of the transistor Q11. The emitter of the transistor Q11 is connected to a connecting point of the diode D5 and resistor R12.

Except for the above, the circuit arrangement of FIG. 6 is the same as that of FIG. 1. In FIG. 6, the same elements as those in FIG. 1 are denoted by the same reference numerals, and their detailed descriptions are omitted.

According to the circuit arrangement of FIG. 6, if the following equation (4) is satisfied, the IGBT QM1 is turned on.

$$V_{D1K} \leq V_{OUT} + (1 + r_6/r_{12}) \ast V_{BE11} + V_{DZ2} + V_{D5} \quad (4)$$

where $r_{12}$ is the resistance of the resistor R12, $V_{BE11}$ is the base-to-emitter voltage of the transistor Q11, and $V_{D5}$ is the forward voltage of the diode D5.

When the output voltage $V_{OUT}$ changes, a voltage $V_{C3-2}$ (=a voltage between terminals of the capacitor C3) for causing the IGBT QM1 to be turned off as expressed by the above equation (4), changes accordingly. It is thus unnecessary to preset the voltage $V_{C3-2}$. In other words, in the circuit arrangements shown in FIGS. 1, 4 and 5, the number of series-connected Zener diodes (DZ2, DZ3) and the ratio of the resistance of resistor R6 to that of resistor R8 have to be adjusted in accordance with the line-up (level) of the output voltage $V_{OUT}$, and the voltage $V_{C3-2}$ also has to be set using an AL master slice approach or the like. However, this adjustment or setting is not required in the circuit arrangement shown in FIG. 6.

Figure 7:
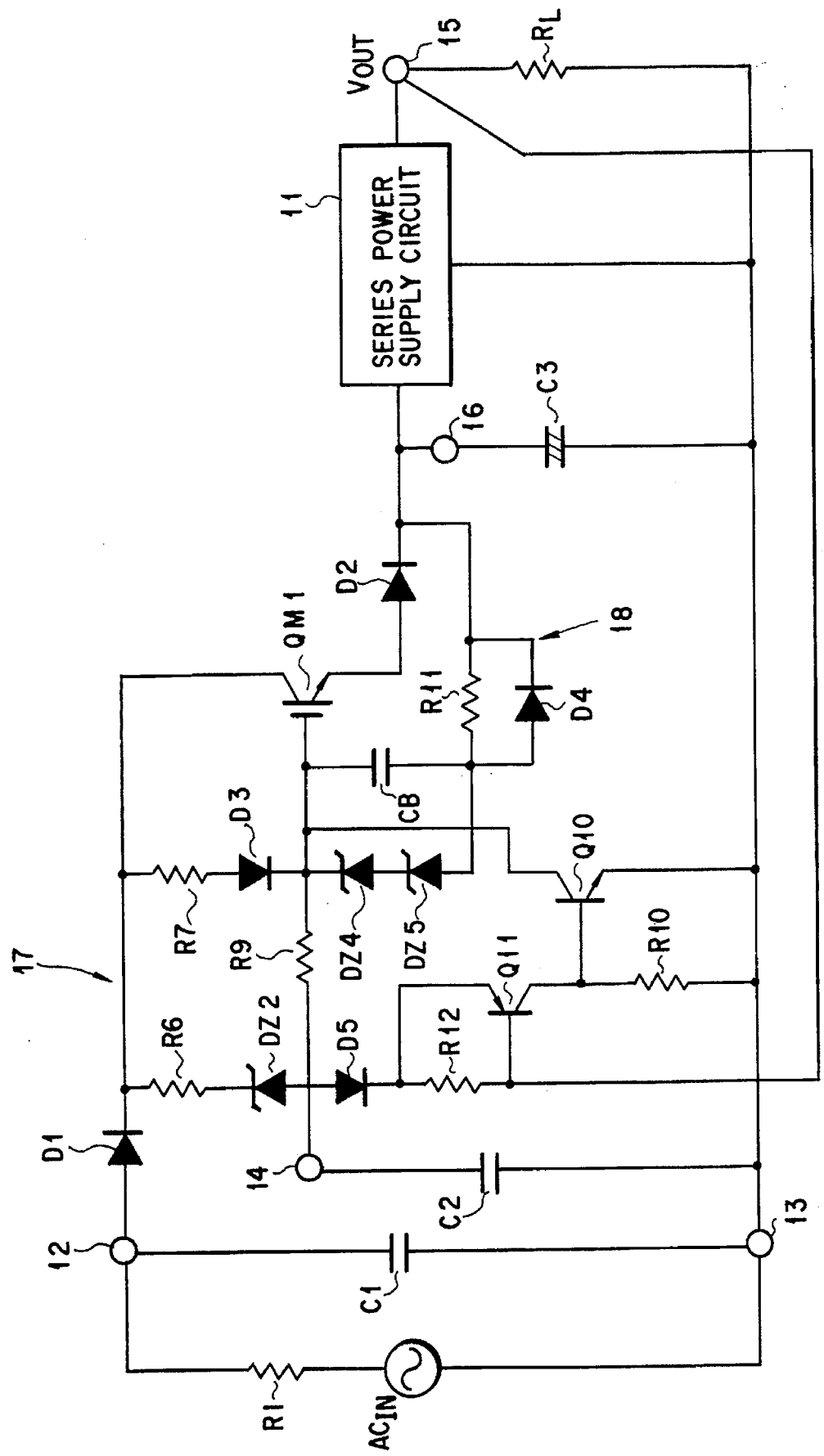
FIG. 7 is a circuit diagram showing an AC/DC converter according to a fifth embodiment of the present invention.

FIG. 7 is a circuit diagram showing an AC/DC converter according to a fifth embodiment of the present invention, which is so arranged that the IGBT QM1 shown in FIG. 6 can be completely turned off. The circuit of FIG. 7 is the same as that of FIG. 6, except that the collector of the transistor Q10 is connected to the gate of the IGBT QM1. Like the circuit arrangements of the second and third embodiments, the circuit arrangement of FIG. 7 allows the IGBT QM1 to be completely turned off and also allows the drain current ID to be decreased to a low value of leakage current or the like.

Figure 8:
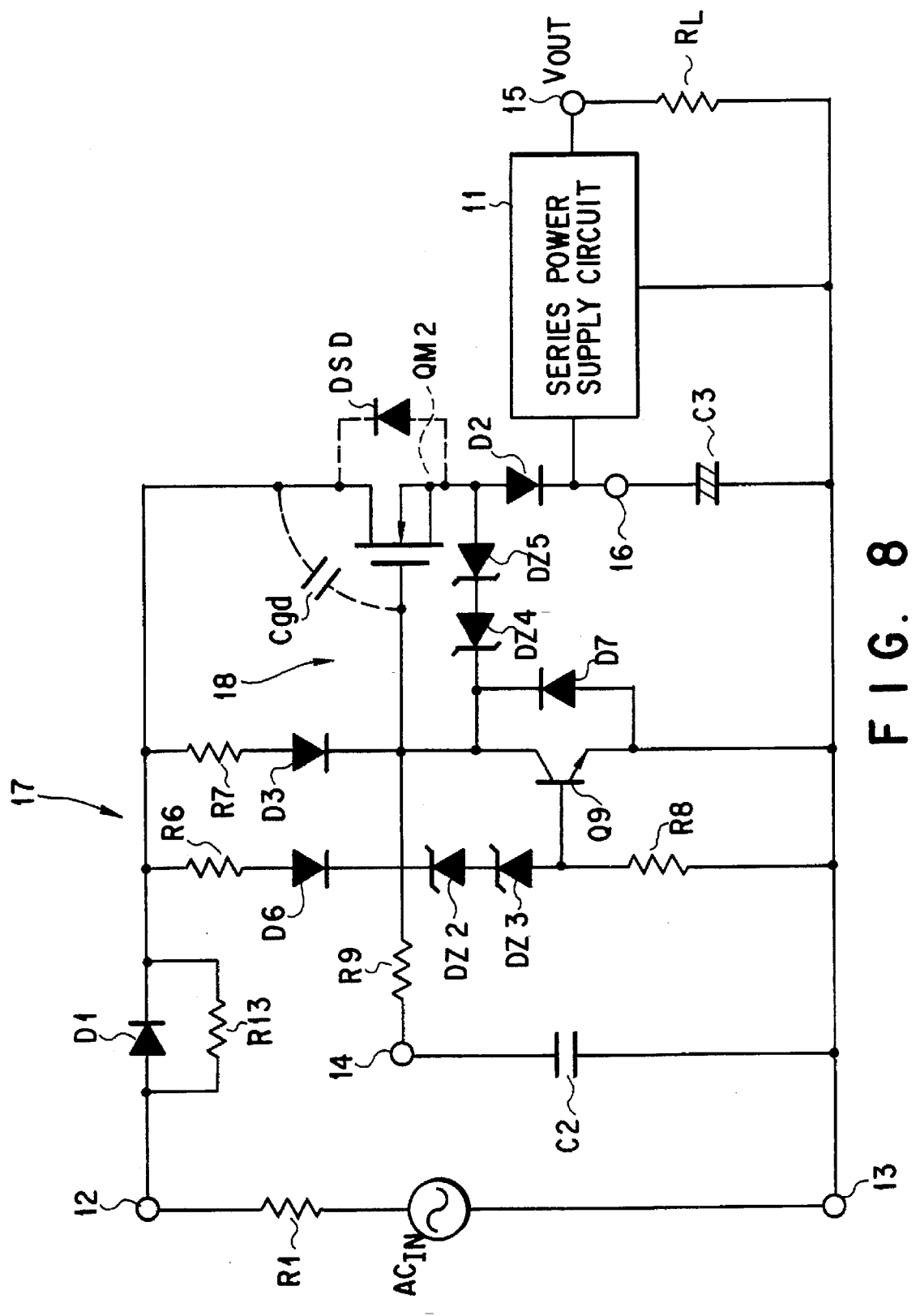
FIG. 8 is a circuit diagram showing an AC/DC converter according to a sixth embodiment of the present invention.

FIG. 8 is a circuit diagram showing an AC/DC converter according to a sixth embodiment of the present invention. In this converter, an N-channel FET (MOSFET) QM2 is used as a main switching device, and the constitutions of the control circuit 17 and booster circuit 18 are different from those in the above-described embodiments.

More specifically, in the circuit arrangement shown in FIG. 8, the anode of the diode D1 for rectifying a half wave of an AC voltage is connected to the first power supply terminal 12, and the cathode thereof is connected to one end of each of the resistors R6 and R7 and to the drain of the MOSFET QM2. A resistor R13 of high resistance is connected between the anode and cathode of the diode D1 and in parallel to the diode D1. The anode-to-cathode paths of the diode D6 and Zener diodes DZ2 and DZ3, and the resistor R8 are connected in series between the other end of the resistor R6 and the power supply terminal 13. The anode-to-cathode path of the diode D3 is connected between the other end of the resistor R7 and the gate of the MOSFET QM2. The resistor R9 is connected between the gate of the MOSFET QM2 and the inhibit terminal 14 to protect the gate of the MOSFET QM2. The collector-to-emitter path of the transistor Q9 is connected between the gate of the MOSFET QM2 and the power supply terminal 13, and the base of the transistor Q9 is connected to the connecting point of the Zener diode DZ3 and resistor R8. The resistors R6 to R8, diodes D3 and D6, Zener diodes DZ2 and DZ3, and transistor Q9 constitute a control circuit 17 serving to turn on/turn off the MOSFET QM2.

The anode-to-cathode path of the diode D7 is connected between the emitter and collector of the transistor Q9. The anode-to-cathode path of each of the Zener diodes DZ5 and DZ4 are connected between the source and gate of the MOSFET QM2.

In FIG. 8, DSD indicates a parasitic diode of the MOSFET QM2, and Cgd denotes a parasitic capacitance between the gate and drain of the MOSFET QM2. The diode D7, Zener diodes DZ4 and DZ5, parasitic diode DSD, and parasitic capacitance Cgd constitute a booster circuit 18.

The anode of the diode D2 is connected to the source of the MOSFET QM2, and the cathode thereof is connected to the capacitor connecting terminal 16. The input terminal of the series power supply circuit 11 is connected to the terminal 16, and the power supply terminal 13 and output terminal 15 are connected to the circuit 11.

The AC power supply $AC_{IN}$ and resistor R1 are externally connected in series between the power supply terminals 12 and 13, as in the first to fifth embodiments. A capacitor C2 is externally connected between the terminals 13 and 14, while a capacitor C3 is externally connected between the terminals 13 and 16. Further, a resistor $R_L$ is connected between the terminals 13 and 15.

In the foregoing circuit arrangement shown in FIG. 8, if the input AC voltage $V_{IN}$ has a value expressed by the following equation (5) during a period of time from the turn-on of the MOSFET QM2 until the end of the positive sinusoidal half wave, the current flows through the diode D1, resistor R6, diode D6, Zener diodes DZ2 and DZ3, and resistor R8. The transistor Q9 is thus turned on, and the gate potential of the MOSFET QM2 is lowered to a GND level and turned off.

$$V_{IN}=(1+r_6/r_8)*V_{BE9}+V_{D6}+V_{DZ2}+V_{DZ3}+V_{D1} \quad (5)$$

If the input AC voltage $V_{IN}$ becomes negative, the current flows through the diode D7, Zener diodes DZ4 and DZ5, parasitic diode DSD, and resistor R13. At the same time, electric charges for rendering the gate and drain of the MOSFET QM2 positive and negative, respectively, are stored in the parasitic capacitance Cgd, and their voltage amounts to a value of $V_{DZ4}+V_{DZ5}$. This voltage is sufficient for turning on the MOSFET QM2 and is maintained during a period of time of the negative input AC voltage. The AC voltage gradually increases from 0 V, and the capacitor C3 starts to be charged when the diode D2 is biased forwardly. Moreover, if the AC voltage increases and exceeds the voltage level given by the above equation (5), the MOSFET QM2 is turned off. This operation is repeated.

The resistor R7 and diode D3 apply the initial trigger to the MOSFET QM2, and the diode D6 prevents the base-to-emitter path of the transistor Q9 from being biased reversely. The diode D3 prevents the charges stored in the gate of the MOSFET QM2 from flowing to the drain thereof or the resistor R13 through the resistor R7. As described above, in the circuit shown in FIG. 8, the parasitic capacitance Cgd of the MOSFET QM2 is actively utilized.

Figure 9:
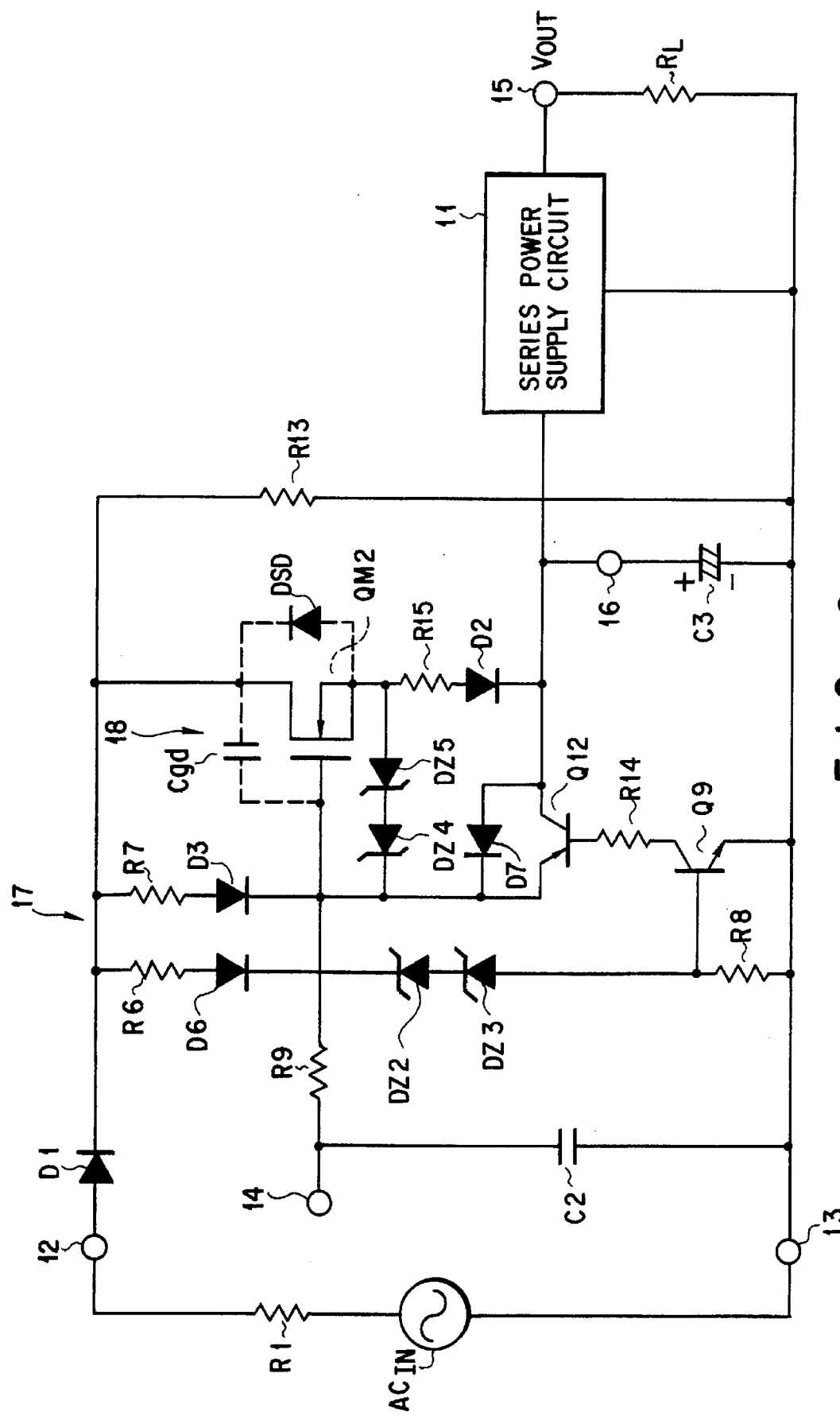
FIG. 9 is a circuit diagram showing an AC/DC converter according to a seventh embodiment of the present invention.

FIG. 9 is a circuit diagram showing an AC/DC converter according to a seventh embodiment of the present invention. The circuit of FIG. 9 differs from that of FIG. 8 on account of a loop for charging the parasitic capacitance Cgd. More specifically, in FIG. 9, the base of the transistor Q9 is connected to a connecting point of the Zener diode DZ3 and resistor R8, the emitter thereof is connected to the power supply terminal 13, and the collector thereof is connected to one end of the resistor R14. The base of the transistor Q12 is connected to the other end of the resistor R14, the emitter thereof is connected to the gate of the MOSFET QM2, and the collector thereof is connected to the capacitor connecting terminal 16. The anode of the diode D7 is connected to the collector of the transistor Q12, and the cathode thereof is connected to the emitter of the transistor Q12. The resistor R13 of high resistance is connected between the cathode of the diode D1 and the power supply terminal 13. Except for the above, the circuit arrangement of FIG. 9 is the same as that of FIG. 8.

In the circuit arrangement shown in FIG. 9, if the AC power supply voltage $AC_{IN}$ has a value expressed by the above equation (5) during a period of time from the turn-on of the MOSFET QM2 until the end of the positive sinusoidal half wave, the current flows through the diode D1, resistor R6, diode D6, Zener diodes DZ2 and DZ3, and resistor R8. The transistors Q9 and Q12 are therefore turned on, and the gate potential of the MOSFET QM2 is lowered to a GND level, thus turning off the MOSFET QM2.

If the AC power supply voltage $AC_{IN}$ becomes negative, the current is generated from the capacitor C3 serving as a power source and flows through the diode D7, Zener diodes DZ4 and DZ5, parasitic diode DSD, and resistor R13 of high resistance. At the same time, electric charges for rendering the gate and drain of the MOSFET QM2 positive and negative, respectively, are stored in the parasitic capacitance Cgd, and their voltage amounts to a value of $V_{DZ4}+V_{DZ5}$. This voltage is sufficient for turning on the MOSFET QM2.

Except for the above, the circuit of FIG. 9 is basically the same as that of FIG. 6, and creates substantially the same advantage.

Figure 10:
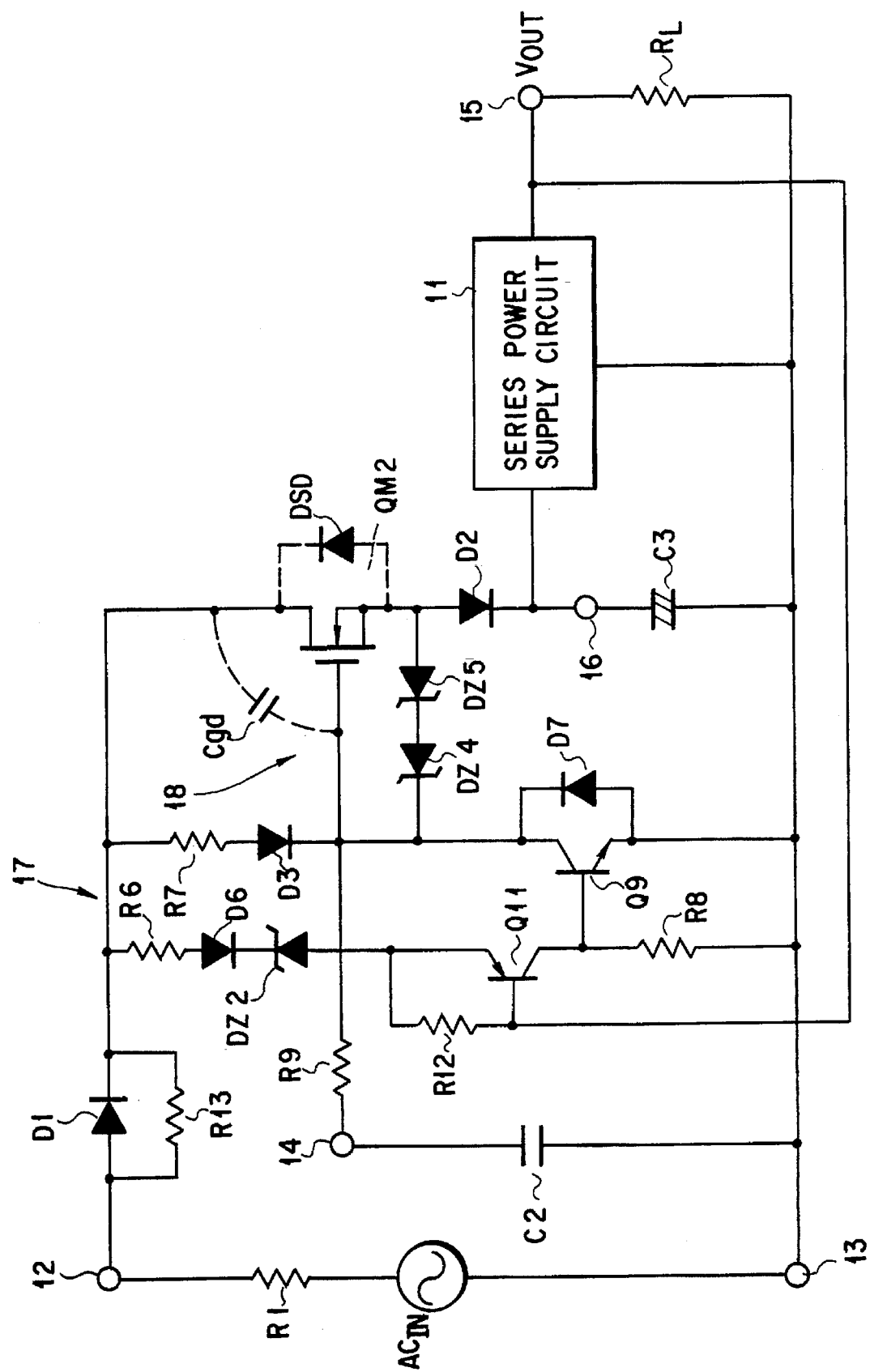
FIG. 10 is a circuit diagram showing an AC/DC converter according to an eighth embodiment of the present invention.

FIG. 10 is a circuit diagram showing an AC/DC converter according to an eighth embodiment of the present invention. The circuit of FIG. 10 differs from that of FIG. 8 in that the output voltage $V_{OUT}$ is fed back to the cathode side of the diode D1.

More specifically, in FIG. 10, the Zener diode DZ3 of FIG. 8 is replaced with a PNP bipolar transistor Q11 and a resistor R12. The emitter of the transistor Q11 is connected to the anode of the Zener diode DZ2, the collector thereof is connected to one end of the resistor R8 and the base of the transistor Q9, and the base thereof is connected to the output terminal 15. The resistor R12 is connected between the base and emitter of the transistor Q11.

In the circuit arrangement shown in FIG. 10, the input voltage $V_{IN}$ for causing the MOSFET QM2 to be turned off, is given by the following equation (6).

$$V_{IN}=V_{OUT}+(1+r_6/r_{12})*V_{BE11}+V_{D6}+V_{DZ2} \quad (6)$$

According to the circuit arrangement shown in FIG. 10, the voltage for causing the MOSFET QM2 to be turned off, need not be preset in order to change the output voltage, since it varies with the output voltage. The circuit of FIG. 10 is the same as that of the sixth embodiment (FIG. 8) in basic operation, except for the above, and produces the same advantage obtained.

Additional advantages and modifications will readily occur to those skilled in the art. Therefore, the invention in its broader aspects is not limited to the specific details and representative devices shown and described herein. Accordingly, various modifications may be made without departing from the spirit or scope of the general inventive concept as defined by the appended claims and their equivalents.

What is claimed is:

1. An AC/DC converter comprising:

rectifying means for rectifying a half wave of an input AC voltage;

an N-channel IGBT having a current path one end of which is supplied with a half-wave rectified output of said rectifying means, said current path having another end, and serving as a main switching device;

control means for turning on said N-channel IGBT when a voltage between a gate of said N-channel IGBT and the other end of the current path exceeds a first level, and for turning off said N-channel IGBT when a voltage between the gate of said N-channel IGBT and the other end of the current path exceeds a second level which is higher than the first level;

booster means for boosting the voltage between the gate of said N-channel IGBT and the other end of the current path up to a level which is higher than the second level, when the voltage between the gate of said N-channel IGBT and the other end of the current path exceeds the first level, said booster means having capacitor means arranged between the gate and the other end of the current path of said N-channel IGBT, and switching means for causing the capacitor means to be charged when the N-channel IGBT is off, and for causing the capacitor means to bootstrap the gate voltage of the N-channel IGBT when the N-channel IGBT is on; and a series power supply circuit for receiving an output from the other end of the current path of said N-channel IGBT, and outputting a DC voltage.

2. The AC/DC converter according to claim 1, further comprising feedback means for feeding the DC voltage output from said series power supply circuit back to a control terminal of said rectifying means to vary the second level in accordance with a level of the DC voltage.

3. The AC/DC converter according to claim 1, wherein said rectifying means includes a diode whose anode is connected to a first power supply terminal and whose cathode is connected to the one end of the current path of said N-channel IGBT.

4. The AC/DC converter according to claim 1, further comprising a diode whose anode is connected to the other end of the current path of said N-channel IGBT and whose cathode is connected to an input terminal of said series power supply circuit.

5. The AC/DC converter according to claim 1, wherein said control means includes:

a first resistor one end of which is connected to an output terminal of said rectifying means;

a first Zener diode whose cathode is connected to other end of said first resistor;

a second Zener diode whose cathode is connected to an anode of said first Zener diode;

a second resistor connected between an anode of said second Zener diode and a power supply terminal;

a third resistor one end of which is connected to the output terminal of said rectifying means;

a first diode whose anode is connected to other end of said third resistor and whose cathode is connected to the gate of said N-channel IGBT;

a third Zener diode whose cathode is connected to the gate of said N-channel IGBT;

a fourth Zener diode whose cathode is connected to an anode of said third Zener diode;

a first transistor having a current path one end of which is connected to an anode of said fourth Zener diode, and having a control terminal connected to the anode of said second Zener diode; and a fourth resistor connected between the other end of the current path of said first transistor and said power supply terminal.

6. The AC/DC converter according to claim 5, wherein in said booster means said capacitor means includes:

a capacitor having one electrode connected to the gate of said N-channel IGBT and other electrode connected to the anode of said fourth Zener diode;

a second transistor having a current path one end of which is connected to the anode of said fourth Zener diode and other end of which is connected to said power supply terminal, and having a control terminal connected to the other end of the current path of said first transistor;

a fifth resistor one end of which is connected to the one end of the current path of said second transistor and other end of which is connected to an input terminal of said series power supply circuit; and a second diode whose anode is connected to the one end of the current path of said second transistor and whose cathode is connected to the input terminal of said series power supply circuit.

7. The AC/DC converter according to claim 5, wherein in said booster means said capacitor means includes:

a capacitor having one connected to the gate of said N-channel IGBT and another electrode connected to the anode of said fourth Zener diode;

a second transistor having a current path one end of which is connected to the gate of said N-channel IGBT and another end of which is connected to an input terminal of said series power supply circuit, and having a control terminal a polarity of said second transistor being opposite to a polarity of said first transistor;

a fifth resistor one end of which is connected to the control terminal of said second transistor;

a third transistor having a current path one end of which is connected to the other end of said fifth resistor and the other end of which is connected to said power supply terminal, and having a control terminal connected to the other end of the current path of said first transistor, a polarity of said third transistor being equal to a polarity of said first transistor;

a sixth resistor one end of which is connected to the other electrode of said capacitor and the other end of which is connected to the input terminal of said series power supply circuit; and a second diode whose anode is connected to the other end of said capacitor and whose cathode is connected to the input terminal of said series power supply circuit.

8. The AC/DC converter according to claim 1, wherein said control means includes:

a first resistor one end of which is connected to an output terminal of said rectifying means;

a first Zener diode whose cathode is connected to the other end of said first resistor;

a first diode whose anode is connected to an anode of said first Zener diode;

a first transistor of a first polarity having a current path one end of which is connected to a cathode of said first diode and having a control terminal connected to an output terminal;

a second resistor connected between the one end of the current path of said first transistor and the control terminal;

a third resistor connected between the other end of the current path of said first transistor and a power supply terminal;

a fourth resistor one end of which is connected to the output terminal of said rectifying means;

a second diode whose anode is connected to the other end of said fourth resistor and whose cathode is connected to a gate of said N-channel IGBT;

a second Zener diode whose cathode is connected to the gate of said N-channel IGBT;

a third Zener diode whose cathode is connected to an anode of said second Zener diode; and a second transistor of a second polarity, opposite said first polarity, having a current path one end of which is connected to an anode of said third Zener diode and the other end of which is connected to said power supply terminal, and having a control terminal connected to the other end of the current path of said first transistor, and in said booster means, said capacitor means includes:

a capacitor one electrode of which is connected to the gate of said N-channel IGBT and other electrode of which is connected to the anode of said third Zener diode;

a fifth resistor one end of which is connected to the one end of the current path of said second transistor and the other end of which is connected to the input terminal of said series power supply circuit; and a third diode whose anode is connected to the one end of the current path of said second transistor and whose cathode is connected to the input terminal of said series power supply circuit.

9. An AC/DC converter comprising:

rectifying means for rectifying a half wave of an input AC voltage;

an N-channel FET having a current path one end of which is supplied with a half-wave rectified output of said rectifying means, said current path having another end, and serving as a main switching device;

control means for turning on said N-channel FET when a voltage between a gate of said N-channel FET and other end of the current path exceeds a first level, and for turning off said N-channel FET when a voltage between the gate of said N-channel FET and the other end of the current path exceeds a second level which is higher than the first level;

booster means for boosting the voltage between the gate of said N-channel FET and the other end of the current path up to a level which is higher than the second level, when the voltage between the gate of said N-channel FET and the other end of the current path exceeds the first level, said booster means having a parasitic capacitance between the gate and the one end of the current path of said N-channel FET, a parasitic diode being between the one end and the other end of the current path of said N-channel FET, and switching means for causing the parasitic capacitance to be charged when the N-channel FET is off, and for causing the parasitic capacitance to bootstrap the gate voltage of the N-channel FET when the N-channel FET is on; and a series power supply circuit for receiving an output from the other end of the current path of said N-channel FET, and outputting a DC voltage.

10. The AC/DC converter according to claim 9, further comprising feedback means for feeding the DC voltage output from said series power supply circuit back to a control terminal of said rectifying means to vary the second level in accordance with a level of the DC voltage.

11. The AC/DC converter according to claim 9, wherein said rectifying means includes a diode whose anode is connected to a first power supply terminal and whose cathode is connected to the one end of the current path of said N-channel FET, and a resistor connected between the anode of said diode and the cathode thereof.

12. The AC/DC converter according to claim 9, further comprising a diode whose anode is connected to the other end of the current path of said N-channel FET and whose cathode is connected to an input terminal of said series power supply circuit.

13. The AC/DC converter according to claim 9, wherein said control means includes:

a first resistor one end of which is connected to an output terminal of said rectifying means;

a first diode whose anode is connected to other end of said first resistor;

a first Zener diode whose cathode is connected to a cathode of said first diode;

a second Zener diode whose cathode is connected to an anode of said second Zener diode;

a second resistor connected between an anode of said second Zener diode and a power supply terminal;

a third resistor one end of which is connected to the output terminal of said rectifying means;

a second diode whose anode is connected to other end of said third resistor and whose cathode is connected to the gate of said N-channel FET; and a transistor having a current path one end of which is connected to the gate of said N-channel FET and other end of which is connected to said power supply terminal, and having a control terminal connected to the anode of said second Zener diode, and said booster means includes:

a third diode whose cathode is connected to the one end of the current path of said transistor and whose anode is connected to the other end of the current path of said transistor;

a third Zener diode whose cathode is connected to the one end of the current path of said transistor; and a fourth Zener diode whose cathode is connected to an anode of said third Zener diode and whose anode is connected to the other end of the current path of said N-channel FET.

14. The AC/DC converter according to claim 9, wherein said control means includes:

a first resistor one end of which is connected to an output terminal of said rectifying means;

a first diode whose anode is connected to other end of said first resistor;

a first Zener diode whose cathode is connected to cathode of said first diode;

a first transistor of a first polarity having a current path one end of which is connected to an anode of said first Zener diode and having a control terminal connected to an output terminal;

a second resistor connected between the one end of the current path of said first transistor and the control terminal thereof;

a third resistor connected between other end of the current path of said first transistor and a power supply terminal;

a fourth resistor one end of which is connected to the output terminal of said rectifying means;

a second diode whose anode is connected to other end of said fourth resistor and whose cathode is connected to the gate of said N-channel FET; and a second transistor of a second polarity having a current path one end of which is connected to the gate of said N-channel FET and other end of which is connected to the power supply terminal, and having a control terminal connected to the other end of the current path of said first transistor, and said booster means includes:
- a third diode whose cathode is connected to the one end of the current path of said second transistor and whose anode is connected to the other end of the current path of said second transistor;
- a third Zener diode whose cathode is connected to the one end of the current path of said second transistor and
- a fourth Zener diode whose cathode is connected to an anode of said third Zener diode and whose anode is connected to the other end of the current path of said N-channel FET.

15. The AC/DC converter according to claim 9, wherein said rectifying means includes a diode whose anode is connected to a first power supply terminal and whose cathode is connected to the one end of the current path of said N-channel FET.

16. The AC/DC converter according to claim 15, wherein said control means includes:

a first resistor one end of which is connected to an output terminal of said rectifying means;

a first diode whose anode is connected to other end of said first resistor;

a first Zener diode whose cathode is connected to a cathode of said first diode;

a second Zener diode whose cathode is connected to an anode of said first Zener diode;

a second resistor connected between an anode of said second Zener diode and a second power supply terminal;

a third resistor one end of which is connected to the output terminal of said rectifying means;

a second diode whose anode is connected to other end of said third resistor and whose cathode is connected to the gate of said N-channel FET; and a first transistor having a current path one end of which is connected to the second power supply terminal and having a control terminal connected to the anode of said second Zener diode; and a fourth resistor one end of which is connected to the output terminal of said rectifying means and other end of which is connected to the second power supply terminal, and said booster means includes:
- a second transistor having a current path one end of which is connected to the gate of said N-channel FET and other end of which is connected to an input terminal of said series power supply circuit;
- a fifth resistor connected between a control terminal of said second transistor and other end of the current path of said first transistor;
- a third diode whose cathode is connected to the one end of the current path of said second transistor and whose anode is connected to the other end of the current path of said second transistor;
- a third Zener diode whose cathode is connected to the one end of the current path of said second transistor, and
- a fourth zener diode whose cathode is connected to an anode of said third Zener diode and whose anode is connected to the other end of the current path of said N-channel FET.

* * * * *

UNITED STATES PATENT AND TRADEMARK OFFICE
CERTIFICATE OF CORRECTION

PATENT NO. : 5,646,514
DATED : July 8, 1997
INVENTOR(S) : Yukio TSUNETSUGU

It is certified that error appears in the above-indentified patent and that said Letters Patent is hereby corrected as shown below:

Claim 7, column 10, line 21, after "one", insert --electrode--.

Claim 14, column 12, line 49, after "connected to", insert --a--.

Claim 14, column 13, line 11, after "transistor", insert --;--.

Claim 16, column 14, line 28, "transistor," should read --transistor;--.

Column 14, claim 16, line 30, "zener" should read --Zener--.

Signed and Sealed this

Twenty-first Day of April, 1998

*Attest:*

BRUCE LEHMAN

*Attesting Officer*     *Commissioner of Patents and Trademarks*